United States Patent [19]
Rijkaart

[11] Patent Number: 5,393,218
[45] Date of Patent: Feb. 28, 1995

[54] MEASURING DEVICE FOR A DOUGH DIVIDER

[76] Inventor: Lodewijk C. Rijkaart, Kijftenbeltlaan 29, 3871 BK Hoevelaken, Netherlands

[21] Appl. No.: 70,303

[22] PCT Filed: Oct. 14, 1991

[86] PCT No.: PCT/NL91/00199
§ 371 Date: Jun. 8, 1993
§ 102(e) Date: Jun. 8, 1993

[87] PCT Pub. No.: WO93/02560
PCT Pub. Date: Feb. 18, 1993

[30] Foreign Application Priority Data
Aug. 8, 1991 [NL] Netherlands .............. 9101360

[51] Int. Cl.⁶ ............................................. A21C 5/02
[52] U.S. Cl. ........................... 425/238; 92/112; 141/27; 141/284; 425/448
[58] Field of Search .............. 425/238, 239, 240, 241, 425/448; 92/112, 185; 141/27, 284

[56] References Cited

U.S. PATENT DOCUMENTS

| | | | |
|---|---|---|---|
| 1,954,501 | 4/1934 | Steere | 425/241 |
| 2,937,663 | 5/1960 | Ashton et al. | 92/112 |
| 3,327,906 | 6/1967 | Gomann | 92/112 |
| 3,364,879 | 1/1968 | Atwood | 91/254 |
| 4,146,067 | 3/1979 | Ziegler | 141/27 |
| 4,391,576 | 7/1983 | Cummins | 425/241 |

FOREIGN PATENT DOCUMENTS 9000440 2/1990 Netherlands .
9002243 10/1990 Netherlands .

Primary Examiner—James P. Mackey
Attorney, Agent, or Firm—Foley & Lardner

[57] ABSTRACT

Dough (10) should, in a volumetric sense, be measured in dough pieces, which during extended use, must very precisely take place. The improved measuring device can be built in dough dividers and gives, through the specific piston construction (3) with connected parts, an amazing result. In the sidewall of the piston an annular-shaped recess (20) is provided and in which a filter (21) is fitted. To the recess (20) a crosswise channel system (15) with a bore (16) is fitted, which is connected to a flexible suction/press hose (17).

15 Claims, 1 Drawing Sheet

MEASURING DEVICE FOR A DOUGH DIVIDER

BACKGROUND OF THE INVENTION

1. Field of the Invention

The invention concerns measuring equipment for lumps or pieces of dough in a volumetric sense from a funnel-shaped container sufficiently filled with dough, sliding horizontally over the dough dividing part, which consists of a cylindrical measuring chamber enclosing an up and down movable piston-shaped body.

2. Related Art

The equipment is a further surprising development of the dough divider similar to that shown in Dutch TIL nos. 9 000 440 and 9 002 243 being "Equipment for measuring out lumps of dough usually called dough divider" and "Method for equipment for measuring lumps of dough, usually called dough divider", respectively.

In the first named Dutch TIL no. 9 000 440, the dough divider is completely described for the model that is most practical and attractive for use. In this TIL the main parts have been described, being a container filled with dough, which is within a certain range horizontally moveable across a measuring device positioned therebelow, consisting of a more or less vertically placed cylindrical-shaped measuring chamber (measuring cylinder), which contains an up and down moveable piston-shaped body. In the container facilities have been fitted, which facilities optimally improve the supply to the measuring device. The measuring device contains specific means, in the first place, to optimize the determination of the volume of the dough. The head of the piston contains a filter and at least one drilled hole to suck the dough into the cylindrical measuring chamber, and to optimally press the dough out later.

In the second mentioned Dutch TIL no. 9 002 243 the working of the measuring cylinder has been further modified so that the quantity of dough in the measuring cylinder is adjustable within even smaller ranges. This means that the suction and pressing of the dough piece with the concerning means have been reasonably optimized.

Field tests with the aforementioned equipment showed however that, with longterm use, starches from the dough started to accumulate inside the filters in the piston head, which leads to a decrease of the suction action of the piston head, thus gradually causing irregularities in the volume of the dough piece.

SUMMARY OF THE INVENTION

In order to eliminate abovementioned problem with the earlier developed measuring equipment, a measuring device according to the present invention has been surprisingly further developed in such a manner, that the cylindrical body comprises a specific piston with an upper and lower part. The sidewall of the piston-shaped body has an annular-shaped recess, whereby the height extends over the top and lower part of the piston. In the head of the piston, more specificly in the upper part facing towards the lower part, also at the interface between aforementioned piston parts, a system of channels has been placed diametrically crosswise leading towards the mentioned recess in the sidewall of the piston, while the channel system is connected with the bottomside of the piston by means of a bore.

The great advantage of the embodiment is that a measuring device has been created producing very precisely measured dough pieces for a longterm period, which is of great importance for all bakeries. The location of the suction-/compression channels guarantees that the dough divider functions in the most optimal sense.

Further, the device according to the invention has been further developed in such a way that in the annular-shaped recess in the sidewall of the piston, an annular-shaped filter has been fitted as deep as possible.

The advantage of this is that pieces of dough which get between the cylinder wall and piston will be caught by the filter and will be, during the compression phase, blown out uniformly, so that no more blocking can occur. This uniformly clean-blowing is possible due to the cylinder wall behind it.

The device according to the invention has been further developed in such a way that the bore in the bottom side of the piston is connected by means of a helical-shaped rolled flexible air hose to a pressure and/or vacuum device.

The advantage of this is that underneath the piston no vacuumtight or pressuretight space has to be created, but that the flexible hose will be connected to the pressure and/or vacuum device through which many technical complications are avoided and by which means a thing or two has been solved.

The device according to the invention has been further developed in such a way that in the lower part of the piston in the sidewall, a sealing ring is placed in the annular-shaped recess.

The advantage of this is that above and alongside the edge of the cylinder head a perfect under- or overpressure situation can be created without complicated technical solutions.

The device according to the invention has been further developed in such a way that the method of the measuring device and more specificly the followed measuring cycle for the dough pieces of the measuring cylinder, according to the above description and claimed in the Dutch TIL no. 9 002 243, in phase E a small circular air-groove is created on the backside at the sealing of the funnel-shaped container filled with dough of the cylindrical measuring device or cylinder.

The advantage of this is that possible locked air underneath the funnel-shaped container filled with dough, can escape, so that the volume of the dough piece and the weight is optimized.

The device according to the invention has been further developed in such a way that the edge of the opening on the lower side of the aformentioned funnel-shaped container filled with dough has been supplied with a knife-shaped part, that the knife-shaped part is circle-shaped at the cutting side.

The advantage of this is that the dough is being cut effectively sharp, which also contributes to a larger accuracy.

The device according to the invention has been further developed in such a way that the aforementioned filter is made of sintered plastic and the thickness of the filter is between 2 and 5 mm and the height of the filter is approximately 35 mm.

The advantage of this is that the filter is of a kind with a relatively robust dimension so that sufficant capacity is provided to blow out deposits up by starch and, while sucking, cannot be silted up with starch.

The device according to the invention has been further developed in such a way that the aforementioned piston-shaped body includes seperate upper and lower parts, which by means of a tap bolt have been connected to another.

The advantage of this is a simplified construction for producing the serveral channels and bores and a simplified, and especially a cheaper possibility of replacement when one of the two parts has worn out.

BRIEF DESCRIPTION OF THE DRAWINGS

The improved measuring device for the dough divider according to a preferred embodiment of the invention has been described more precisely in the drawing, wherein.

DESCRIPTION OF THE PREFERRED EMBODIMENTS

Figure 1:
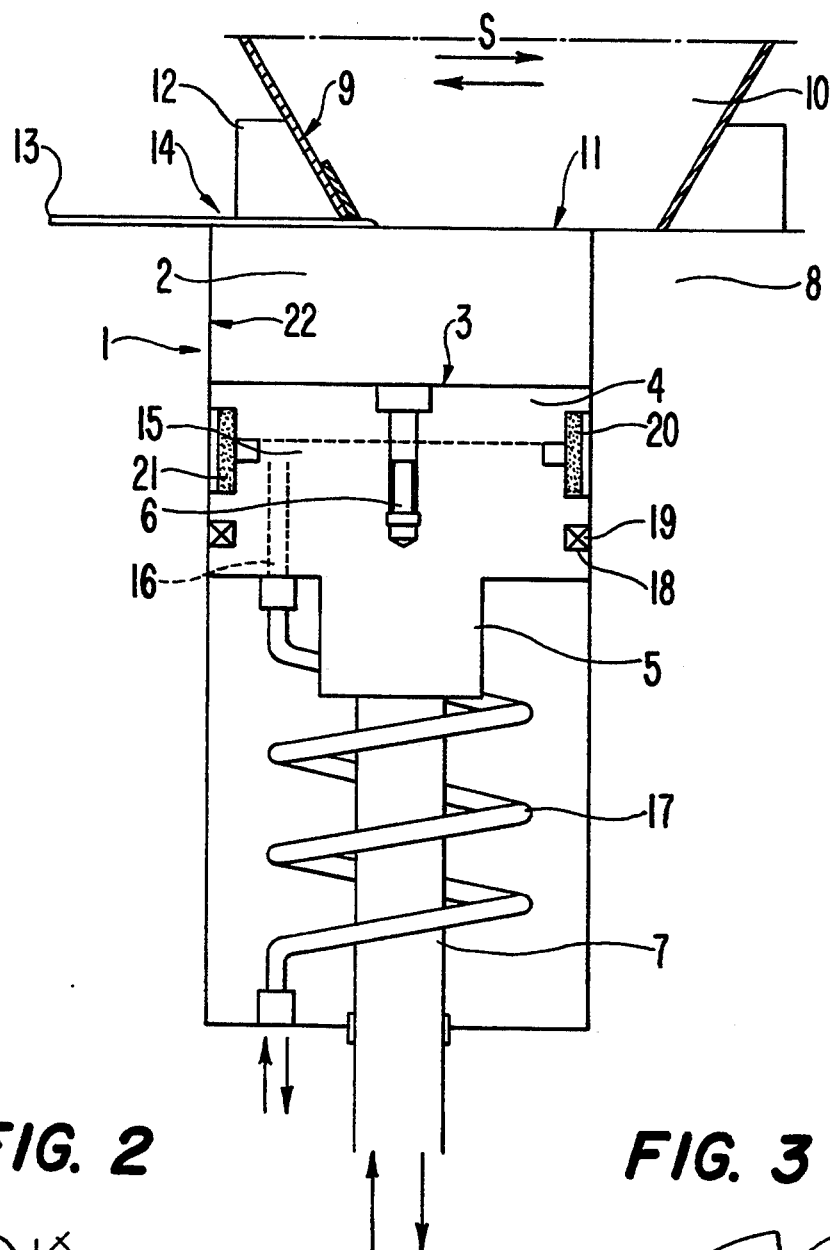
FIG. 1 is a vertical cross-section of the improved measuring device for the dough divider according the invention.
Figure 2:
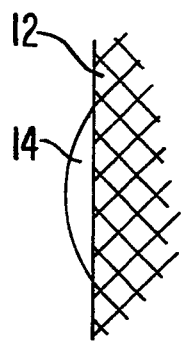
FIG. 2 is the circular, segment-shaped opening above the cylindrical measuring chamber, created by an incomplete covering with the edge of the funnel-shaped container filled with dough.
Figure 3:
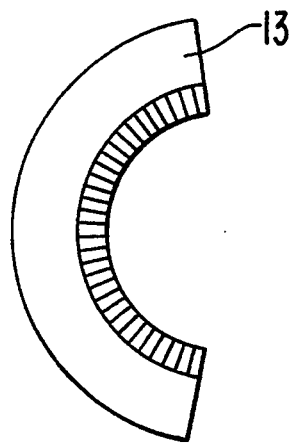
FIG. 3 is the circle-shaped knife in the opening underneath the funnel-shaped container filled with dough in order to sharply cut the dough piece.

In FIG. 1 the vertical section of the improved measuring device for the dough divider has been indicated with the reference number 1. In a cylindrical measuring chamber 2, there is an up and down moveable piston-shaped body (the piston) 3, that preferably has the shape of a circular cylinder. The piston 3 consists of an upper part 4 and a lower part 5, which are connected to one another by a tapbolt 6. The complete piston 3 is moved up and down by means of a piston rod 7 with connected parts. The cylindrical measuring chamber 2 with aforementioned connected parts is situated in a block-shaped unit 8. The block-shaped unit 8 moves mechanically over one stroke (S) over the funnel-shaped container 9 filled with dough 10. The bottom side of the funnel-shaped container 9 has an opening 11, which is surrounded by a funnel block 12. The funnel block 12 is according to the invention, provided with a circular-shaped knife 13. FIG. 3 gives a more precise description of the shape. All the parts have been drawn in such a way that the measuring chamber 2 is filled with dough 10 and while the phase is reached that the funnel-shaped container moves further over its stroke and the dough is being cut, and a circular segment-shaped opening 14 is created to let possible airbubbels escape, which is shown more in detail in FIG. 2. In the upper part 4 of the piston-shaped body 3, according to the invention, a crosswise channel system 15 has been constructed, which is connected by a bore 16 to a flexible pressure and/or and vacuum hose or lead 17. The pressure can be an underpressure of −0.25 to −0.90 atm to an overpressure of 1 to 3 atm. In the lower side 5 of the piston shaped body an annular-shaped groove 18 is cut in order to place a sealing ring 19, for example a "quad-ring". The upper part 4 and the lower part 5 of the piston-shaped body 3 have been applied with an annular-shaped recess 20, in which a filter 21 is mounted according the invention. The filter 21 has in cross-section a square shape, and is composed of sintered plastic-like polyethylene, by which good, penetratable pores are created with a diameter between 8 and 40 μ. The filter has preferably the shape of an annular-shaped ring, but could also consist of segment parts of mentioned annular parts. This depends on the preference of mounting. The large advantage of mounting an annular-shaped filter with a square cross-section is, that the filter 21, when overpressed through the existance of the cylinder wall 22, will uniformly be blown clean throughout its complete periphery, which would happen batchwise if a filter without a cylinder wall "behind" it is fitted. The placement of the filter 21, according to the invention, in the sidewall of the piston-shaped body 3, seems to be a surprisingly correct manner and is therefore the best technical solution.

Finally can be mentioned that a preferred embodiment of the invention has been described, and of course modifications are possible, without abandoning the protection limits of the patent specifications.

What is claimed is:

1. Device for measuring dough, comprising:
   a) a funnel-shaped container filled with dough and horizontally moveable over a measuring device, the measuring device including:
   b) a cylindrical measuring chamber below the container,
   c) a piston having an upper part and a lower part movable up and down in the measuring chamber;
   d) an annular recess in the sidewall of the piston, the height of the recess extending between the upper part and lower part of an interface thereof;
   e) a system of channels extending diametrically crosswise from the recess in the upper part and communicating with a bore in the lower part to a lower side of the piston.

2. Device as claimed in claim 1, wherein the annular recess in the sidewall of the piston has an annular-shaped filter mounted therein.

3. Device as claimed in claim 1, wherein the bore at the lowerside of the piston is connected to a helical-shaped rolled flexible airhose.

4. Device as claimed in claim 1, wherein the lower part of the piston has fitted in the sidewall in an annular-shaped recess a sealing ring.

5. Device as claimed in claim 1, wherein, an edge of an opening in the funnel-shaped container filled with dough is supplied with a knife-shaped part.

6. Device as claimed in claim 5, wherein the knife-shaped part is circle-shaped on a cutting side.

7. Device as claimed in claim 2, wherein the filter has a square cross-section.

8. Device as claimed in claim 2, wherein the filter is made of sintered plastic.

9. Device as claimed in claim 8, wherein the thickness of the filter is between 2 and 5 min.

10. Device according to claim 8, where the height of the filter is approximately 35 mm.

11. Device as claimed in claim 10, wherein the bore is connected to an underpressure of −0,25 to −0,90 atm and an overpressure of 1 to 3 atm.

12. Device as claimed in claim 8, wherein the sintered plastic is polyethylene with a pore size between 8 and 40 μ.

13. Device as claimed in claim 1, wherein the upper and lower parts are connected to one-another by means of a tap bolt.

14. Device according to claim 3 wherein the airhose is connected to a pressure device.

15. Device according to claim 3 wherein the airhose is connected to a vacuum device.

* * * * *